Figure 1:
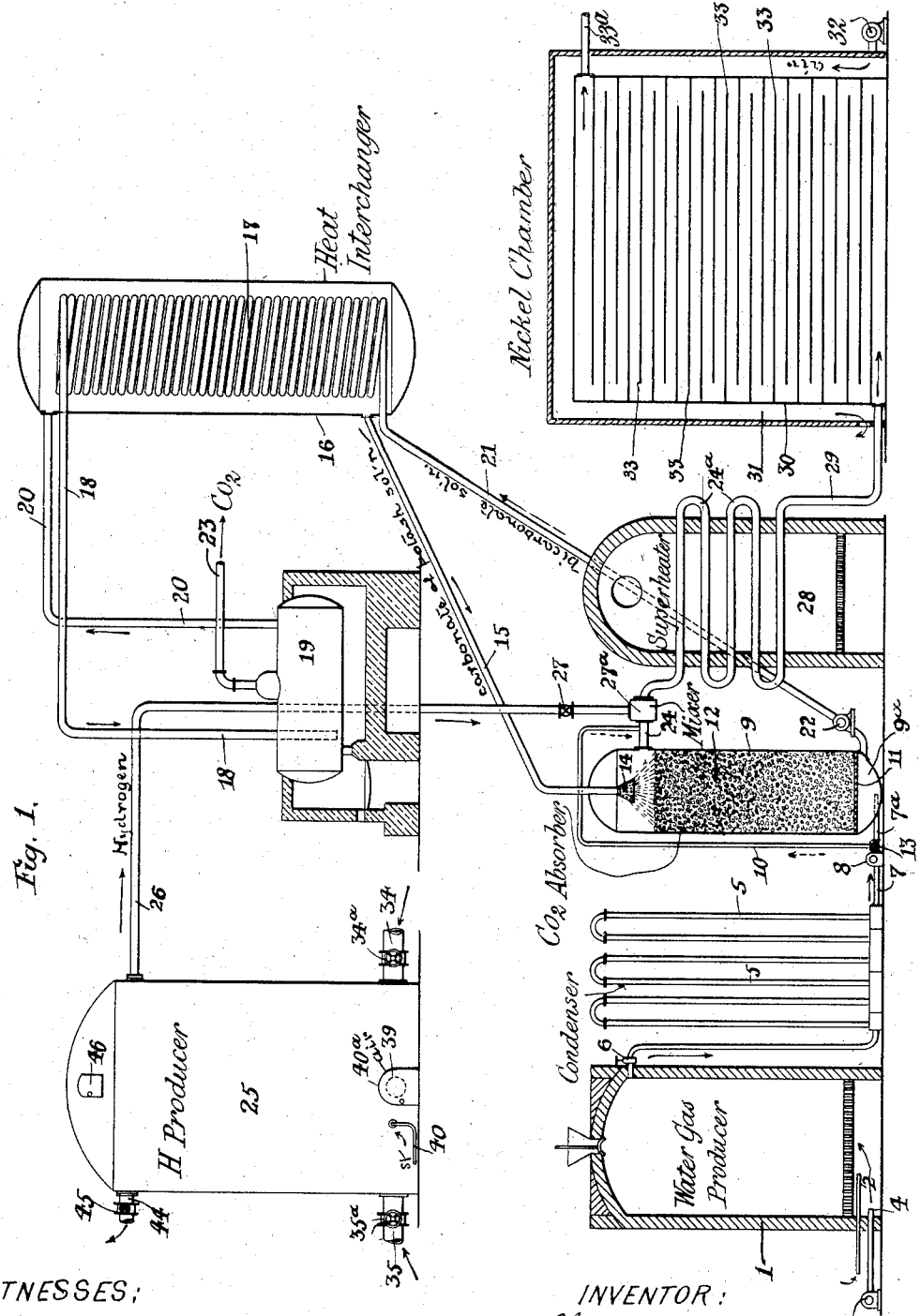

No. 738,303. PATENTED SEPT. 8, 1903.
H. S. ELWORTHY.
PROCESS OF MANUFACTURING GAS.
APPLICATION FILED SEPT. 17, 1902.
NO MODEL. 3 SHEETS—SHEET 3.

WITNESSES:
Fred White
Thomas Wallace

INVENTOR
Herbert Samuel Elworthy,
By his Attorneys
Arthur G. Fraser & Co.

No. 738,303. Patented September 8, 1903.

UNITED STATES PATENT OFFICE.

HERBERT S. ELWORTHY, OF LONDON, ENGLAND, ASSIGNOR OF ONE-HALF TO ERNEST HENRY WILLIAMSON, OF LONDON, ENGLAND.

PROCESS OF MANUFACTURING GAS.

SPECIFICATION forming part of Letters Patent No. 738,303, dated September 8, 1903.

Application filed September 17, 1902. Serial No. 123,747. (No specimens.)

*To all whom it may concern:*

Be it known that I, HERBERT SAMUEL ELWORTHY, consulting chemical engineer, of Dashwood House, New Broad street, London, England, have invented certain new and useful Improvements in the Manufacture of Gas for Illuminating, Heating, and Power Purposes, of which the following is a specification.

This invention relates to a new process for manufacturing gas consisting chiefly of methane or marsh gas for commercial purposes.

By the present invention I manufacture a gas consisting chiefly of methane from water-gas by first producing water-gas, (which I define as any gas made by passing steam, superheated or otherwise, over or through ignited carbonaceous fuel,) adding hydrogen where necessary, and then passing the gas or mixture of gases over finely-divided nickel at a suitable temperature. I prefer to obtain the water-gas or mixture of water-gas and hydrogen by the process hereinafter described. In general, however, I prefer to proceed in the manner first to be detailed, though I do not confine myself to this particular method.

Methane consists of hydrogen and carbon in the proportion represented by the formula $CH_4$. In order therefore to obtain this gas, it is necessary to have a sufficient quantity of hydrogen present in the mixture not only to combine with the carbon to farm the methane, but also to combine with the oxygen liberated from its combination with the carbon.

Water-gas made in the ordinary way consists principally of a mixture of carbon monoxid and hydrogen in nearly equal volumes, together with a small quantity of nitrogen and carbon dioxid. Now for the purpose of my invention it is necessary to have about three volumes of hydrogen to each volume of carbon monoxid contained in the water-gas in order to obtain the reaction represented by the equation $CO + 3H_2 = CH_4 + H_2O$. Having obtained the water-gas, I proceed to secure the necessary quantity of hydrogen to bring up the proportions to those stated above according to the composition of the water-gas mixture. In order to do this, I may obtain my hydrogen by any of the well-known processes, as by electrolysis of water, but I prefer to obtain it by the reaction of steam upon metallic iron, whereby at a suitable temperature the steam is decomposed, the hydrogen liberated, and the iron converted to the state of magnetic oxid in accordance with the equation $3Fe + 4H_2O = Fe_3O_4 + 4H_2$. The hydrogen having been mixed with the water-gas in suitable proportion, as before mentioned, I proceed to pass the mixture of water-gas and hydrogen over finely-divided nickel, whereby the carbon is hydrogenized and the oxygen liberated is converted into water by the excess of hydrogen present. The nickel apparently takes no part in the reaction, as at the end of the operation it remains unaltered, the reaction belonging apparently to the so-called "catalytic" or "contact" order. It is probable, however, that at an intermediate stage the reaction discovered by Ludwig Mond takes place—viz., the production of nickel carbonyl—but this will be immediately decomposed by the comparatively high temperature at which the process is worked. The nickel may simply be placed in layers in the powdered state upon suitably-arranged shelves in the retort, chamber, or other vessel, or it may be caused to adhere to the surface of some porous material, as broken fire-brick, pumice-stone, or asbestos fiber, an agglutinating and not easily fusible substance being used, such as pipe-clay, fire-clay, magnesium chlorid, or other suitable material, or the finely-divided nickel itself may be made up into balls or blocks of any suitable size by being mixed with an agglutinating material and preferably also with some organic material, such as sawdust, which can easily be burned away, leaving the blocks more porous, or the nickel may be in the form of wire gauze or foil or other suitable form, so as to present a large surface to the gases. The nickel, however prepared, is placed in a retort, tower, or chamber, which may be heated internally or externally by any suitable means to the required temperature—say, for example, 250° centigrade—and the gases may also be heated before admission to the chamber. Instead of heating the chamber itself the gases before admission may be heated to the required temperature, and I prefer this method, because in this manner the reaction is more under control, as hotter or colder gas can be admitted at any stage of the reaction so as to control the temperature. The reaction is strongly exothermic, and it is therefore advisable to be able to readily control the temperature, because should the temperature rise too high the monoxid will be decomposed into carbon and not converted into methane. I may control the temperature, as before described, by admitting the reaction-gases at a higher or lower temperature, as required, or with the same object I may admit to the nickel-chamber at any suitable stage a certain volume of steam or it may be a certain volume of cold methane. If steam be employed, it can be condensed, so that the resulting methane will not be contaminated thereby. Or with the same object of controlling the temperature of the reaction I may circulate a definite volume of water or cold air or other gas through coils of pipe in the chamber or in a hollow casing surrounding said chamber or it may be through hollow shelves upon which the nickel rests. The methane produced in the nickel-chamber is collected in a gas-holder for use, being led through a condenser to remove the steam produced by the reaction.

A very important and commercially-valuable modification of my invention is as follows: By suitable steaming during the water-gas process—i. e., by stopping the steaming at the required point—a gas having approximately the composition $CO_2 + CO + 3H_2$ may be obtained, and from this the carbon dioxid may be removed by any well-known method; but I prefer to effect its removal by passing the gas over an alkaline carbonate or through a solution of these salts, and the carbonic acid may be recovered from the moist salts by passing superheated steam over them, or it may be recovered from the solution by boiling. After the removal of the carbon dioxid the mixture of carbon monoxid and hydrogen is in approximately the right proportion for the production of methane. Thus while in the method of manufacturing water-gas generally adopted it is essential to raise the proportion of carbon monoxid to the highest limit obtainable and to keep down the proportion of carbon dioxid to the lowest limit for the purpose of my invention this is more or less a matter of indifference, as I can continue the steaming to obtain a mixture of the character just mentioned and remove the carbon dioxid before passing the gases over the nickel. Therefore while in the ordinary well-known process of water-gas manufacture the blowing method is generally twice as long at least as the steaming process, in the case of my invention the steaming period may be very considerably increased and consequently a far greater quantity of water-gas obtained at each reversal, thereby effecting a very great saving of fuel now lost during the prolonged blowing-up periods.

Instead of manufacturing the water-gas in the ordinary manner, as described above, when a very pure methane free from nitrogen is required the water-gas may be made in the manner fully detailed in the specification of United States Patent No. 658,628, in which the steam is superheated to such a degree by passing through modified regenerative stoves that on coming in contact with the fuel it is decomposed into carbon monoxid, carbon dioxid, and hydrogen, the carbon dioxid being removed prior to passing the remaining gases over the nickel.

It may be advisable after a certain time to revivify the nickel, and this may be done by passing air at a high temperature over it to oxidize the metal and then reducing it by means of hydrogen, or instead of this process the method of converting it into nickel carbonyl by passing CO over it at a lower temperature may be used, the nickel liquid compound passing away into another chamber or retort, where it is decomposed by raising the temperature, and the CO liberated can be used over again to volatilize a further quantity of nickel.

In the accompanying drawings I show an arrangement of apparatus which will serve to illustrate the practical application of the invention.

Figure 2:
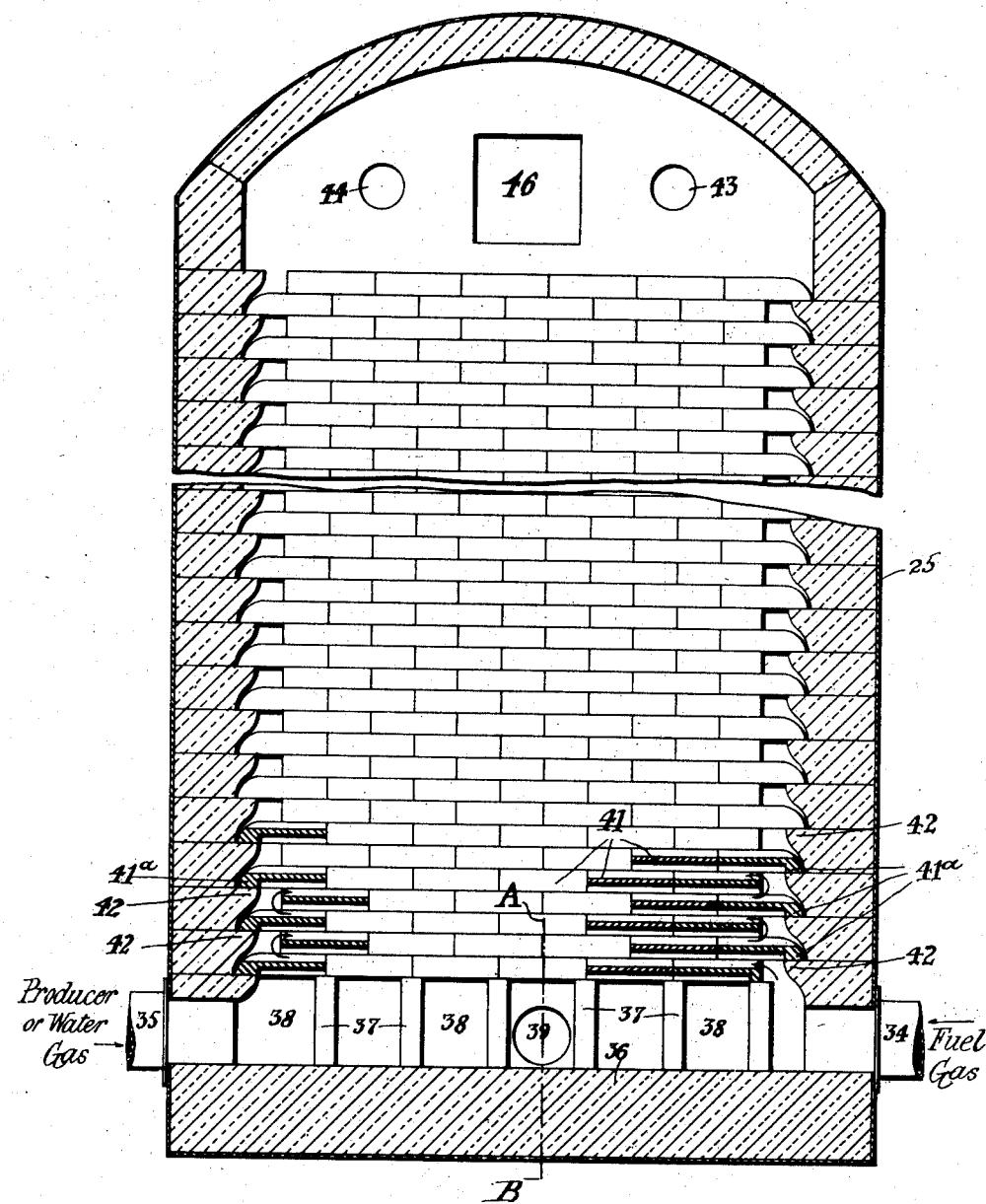
Figure 3:
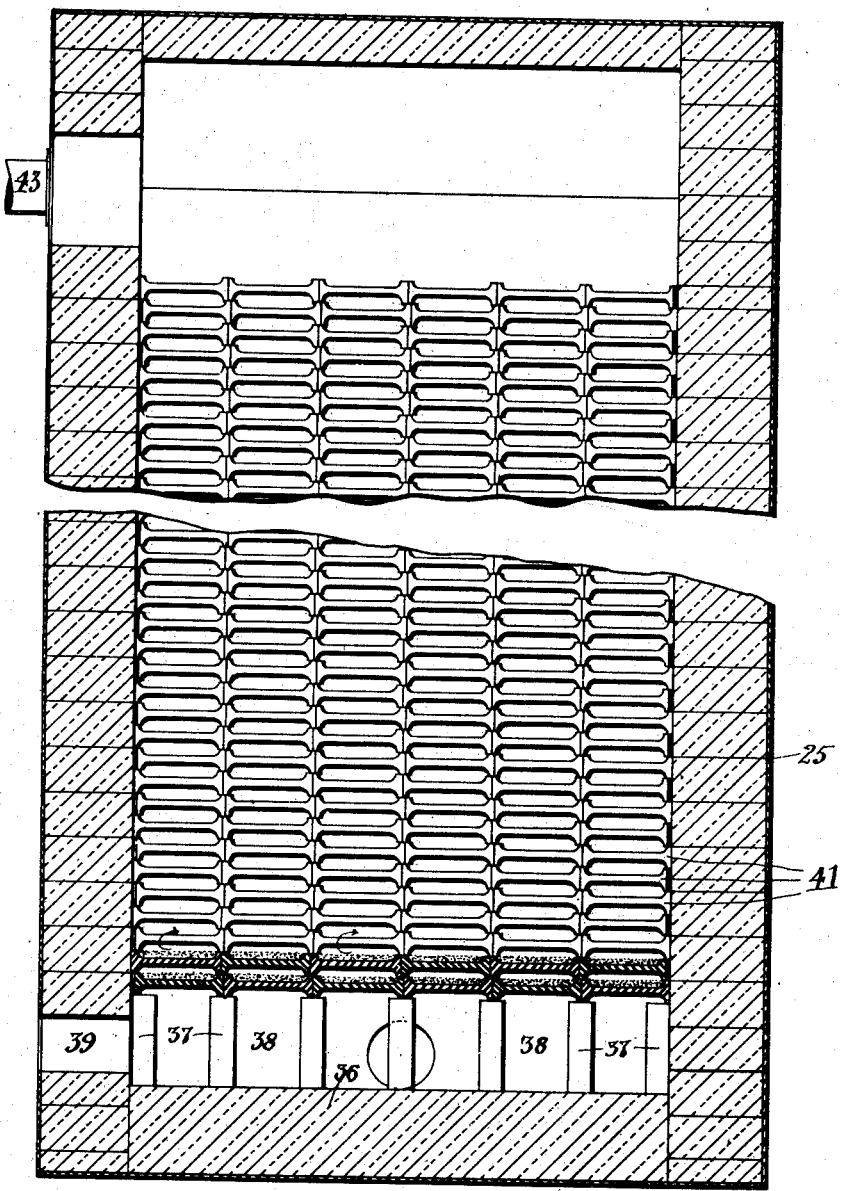

In the drawings, Figure 1 is a diagrammatic view of a plant suitable for carrying out the invention as before mentioned. Fig. 2 is a sectional side elevation, on an enlarged scale, of the improved hydrogen-producer constructed to embody the improvements hereinbefore described. Fig. 3 is a sectional front elevation of the hydrogen-producer, partly in transverse vertical section, on the line A B of Fig. 2, a few of the end trays being also shown in section, so as to illustrate the construction of same, as hereinafter described.

1 is the water-gas producer, which may be of any ordinary or suitable construction.

2 is the steam-inlet thereto, 3 the air-blower delivering the air-blast thereto when required by the inlet 4.

5 is a condenser, through which the water-gas passes on leaving the producer 1, a regulating-valve 6 being interposed to open, close, or regulate the flow of gas, as required.

7 is a pipe leading from the condenser, and 8 is a blower for drawing the gaseous mixture from the condenser and forcing it through the system.

13 is a three-way cock, whereby the gaseous mixture may be directed through the pipe 7ª to the carbon-dioxid absorber 9 or led by the pipe 10 direct to the pipe 24, beyond the absorber 9, according as it is desired to remove the carbon dioxid from the gaseous mixture or not. The carbon-dioxid absorber is shown as of cylindrical form with domed ends. It is provided at bottom with a perforated false bottom or grid 11, upon which is supported a sufficient depth of broken fire-brick, coke, breeze, or the like, 12. When the cock 13 is turned to direct the gases to the absorber, they are delivered by the blower 8 through the pipe 7ª to the space 9ª below the false bottom 11 and rise up through the material thereon.

14 is a spraying-head attached to a pipe 15 and serving to spray a solution of carbonate of potash upon the surface of the coke or other material in the absorber. The pipe 15 leads from the casing of a heat-interchanger 16, containing a coil 17, the upper end of which leads by a pipe 18 to a boiler 19, the pipe 18 dipping down to near the bottom of said boiler. Another pipe 20 leads from the top of the casing of the heat-interchanger 16 to the top of the boiler 19. The bottom of the coil 17 communicates by a pipe 21 with the chamber 9ª of the absorber 9, a circulating-pump 22 being interposed between the coil 17 and said absorber. The pump 22 serves to draw the solution of bicarbonate of potash resulting from the absorption of the carbonic acid by the carbonate-of-potash solution from the bottom of the absorber 9 and deliver it through the pipe 21, coil 17, and pipe 18 to the boiler 19, where the carbon dioxid is driven off by the heat of the furnace and passes away from the crown of the boiler by a pipe 23 to a suitable gas-holder or other apparatus for use as and when required. The regenerated carbonate-of-potash solution passes from the top of the boiler by the pipe 20 through the casing of the heat-interchanger 16, where it heats up the cool solution in the coil 17, being itself cooled by the incoming bicarbonate-of-potash solution and passes by the pipe 15 to the top of the absorber 9, where it is sprayed over the coke or fire-brick filling by the spraying-head 14. In this way a solution of carbonate of potash is continuously delivered to the absorber, where it meets the gaseous mixture and absorbs the carbon dioxid therefrom, the resulting solution of bicarbonate being passed through the heat-interchanger to the boiler, so that the dioxid is usefully recovered and the heat is advantageously economized.

24 is a pipe to which the gaseous mixture passes from the top of the absorber 9, (or direct by the pipes 7 and 10, as the case may be.)

25 is the hydrogen-producer, shown in detail in Figs. 2 and 3 and more fully hereinafter described. 26 is a pipe leading from the upper part thereof, by which the hydrogen generated passes to the mixing-chamber 27ª, into which the pipe 24 likewise delivers, so as to effect the proper admixture of the gases therein. A regulating-valve 27 is interposed in the pipe 26 to permit the supply of hydrogen to be regulated so as to adjust the hydrogen in the ultimate mixture to the desired proportion, as before explained, or to allow of the hydrogen being shut off when it is not required to mix the same with the gases passing to the nickel chamber or chambers or for other purpose, as required.

The mixing-chamber 27ª is connected to a coil or serpentine 24ª, arranged in a superheater 28, arranged to be heated by gaseous or solid fuel, as desired, and provided with suitable valves or equivalent means for regulating the temperature. In its passage through this coil or serpentine the gaseous mixture is heated to the proper temperature to insure the desired reaction between said mixture and the nickel in the nickel-chamber when it is delivered thereto. From the coil or serpentine 24ª the mixture passes by a pipe 29 to the nickel-chamber 30. The nickel-chamber is of rectangular form and is shown as constructed with an air-casing 31, through which air may be circulated by a pump 32 when required, so as to control the temperature within said chamber or chambers. The nickel, in any of the forms hereinbefore described, is carried on trays 33, superposed in baffled order in the chamber in such manner that the gaseous mixture passes up in a serpentine course over each of the trays successively from bottom to top and is brought into intimate contact with the nickel thereon. The mixture of methane and steam produced in the nickel-chamber 30 passes off from the top of said chamber at 33ª, whence it may be led through a condenser (not shown) to a gas-holder.

Let us assume, by way of example, that it is desired to produce a water-gas consisting substantially of carbon monoxid, carbon dioxid, and hydrogen, wherein the monoxid and hydrogen are present in such proportion that on removal of the dioxid the monoxid and hydrogen shall remain in sufficient proportion for their substantial transformation in the nickel-chamber into methane and water, as before explained. The working of the apparatus will then be as follows: As the water-gas is produced in the producer 1 the valve 6 is opened, three-way valve 13 is turned to direct the gases to the absorber 9, the regulating-valve 27 is closed, and the blower 8 and circulating-pump 22 are set in operation. The mixture of hydrogen, carbon monoxid, and carbon dioxid is drawn by the blower through the condenser 5 and delivered to the absorber 9, rising through the coke or fire-brick and the descending stream of carbonate-of-potash solution therein, whereby the carbon dioxid is absorbed. The remaining gases then pass through the coil or serpentine in the superheater 28, the temperature in the superheater being regulated to heat said gases to the proper temperature for the reaction—for example, 250° centigrade. The gases then pass to the nickel-chamber 30, where they are transformed into methane and steam, the mixture of methane being passed through a condenser (not shown) where the steam is condensed, and the methane then passes to the gas-holder, as above explained. Should the temperature in the nickel-chamber rise too high, this is rectified by pumping air through the casing 31 or spraying water into said casing or in other suitable way. It is of advantage to maintain the temperature in the chamber by this means at or slightly above that necessary for the reaction.

Let us assume another case—namely, that in which water-gas consisting substantially of carbon monoxid and hydrogen is produced, additional hydrogen being then mixed therewith to bring the hydrogen up to the proper proportion, the resulting mixture being caused to react with the nickel to produce methane. In this case the apparatus would be operated as follows: Cock 6 is opened, three-way valve 13 turned to pass the gaseous mixture from the condenser to pipe 24 direct, and regulating-valve 27 adjusted to deliver the hydrogen to the mixing-chamber $27^a$ in proper proportion. The blower 8 is set in operation, but the circulating-pump 22 is of course not run. The mixture of gases passes through the coil in the superheater 28, the heat wherein is regulated to a suitable temperature, say 250° centigrade. Thence they pass to the nickel-chamber 30, where the monoxid and hydrogen are converted into methane and water, the resulting mixture being passed through a condenser to a gas-holder and the temperature in the nickel-chamber being kept within the proper limits, as before described. In any case, as will be readily understood, hydrogen can be admitted by the regulating-valve 27 to the mixing-chamber $27^a$ as and when required to bring the hydrogen content of the gaseous mixture up to the proportion required for the reaction.

I will now proceed to describe the improved hydrogen-producer, as illustrated in the drawings. This producer consists of a rectangular structure of refractory brick with an outer metallic shell or casing and having an arched top, as shown. It is formed or provided at the base with inlet 34 for gaseous fuel for heating up the generator when required and also with another inlet 35 for producer or water gas for reducing the oxid of iron formed in the hydrogen-producing reaction, both these inlets being provided with suitable valves $34^a$ $35^a$, Fig. 1, to enable them to be closed. It will be obvious that one such inlet would suffice, but it is in many cases convenient to have separate inlets for the heating and reducing operations. On the floor 36 of the generator I dispose a convenient number of pillars or supports 37, these being arranged at equal distances apart along and across the base of the generator, so as to support the ends of the trays for containing iron when these are superposed thereon, as described later. A combustion-chamber 38 is thus provided at the base of the generator. A valved air-inlet 39 opens through the side of the generator into the combustion-chamber 38, and a steam-inlet pipe 40, Fig. 1, is also arranged to discharge into same.

$40^a$ is a manhole for cleaning purposes provided with a suitable door.

41 represents the trays for containing the iron. These are of refractory fire-brick. They are of square shape in plan and are of I form in section, as seen in Fig. 3—that is to say, they are formed with a flange or lip at two opposite sides extending for a short distance above and below the central horizontal plane of the tray, so as to support the flanges of the tray next above and provide a channel between each pair of superposed trays for the passage of the steam or gases. These trays are filled with iron in powdered form and are piled one above another along and across the generator, the abutting corners or angles of the bottom range of trays being supported by the pillars 37, disposed, as before described, at equal distances along and across the floor of the producer. The remaining trays are built up over the bottom range of trays, each range being supported by the flanges of the trays of the row next below. The refractory fire-brick lining at the right and left hand side of the generator is formed with a vertical series of supporting-ledges 42, extending from front to back, each of these ledges being designed to support the end trays of the range next above at the side where the particular ledge is situated. Each range of trays is disposed in baffled or staggered order with respect to the range next above it, the left-hand trays of the bottom row, for example, being supported on the bottom left-hand ledge 42 and lying close against the wall of the generator, while the right-hand trays of the bottom range do not extend quite to the wall on the right-hand side. (See Fig. 2.) The right-hand end trays of the second range are then supported on the bottom right-hand support 42 and similarly lie close against the wall at that side, while the left-hand trays of this second range do not extend quite to the opposite wall, and so on to the top, this arrangement being adapted to allow for expansion of the trays when heated. The end trays of each range which are supported by the ledges 42 are somewhat different in shape from the other trays. Their form will be seen on reference to Fig. 2, which shows some of these end trays in section. It will be seen that the flanges or lips of these trays are curved to conform to the curve of the supporting-ledges, and at the side adjacent thereto they are formed with a lip $41^a$, extending from front to back of the tray, so that when each range of trays is placed in position the heating or reducing gases or steam, as the case may be, passed through the generator is or are baffled by every succeeding range of trays at each side of the generator alternately, so that the steam or gases pass from the top of each range of trays to the top of the range next above, so as to pass over the material on same, as shown by the arrows, Figs. 2 and 3. Further, the abutting lips or flanges of the trays, which are built up as before described, constitute vertical walls or partitions which divided the interior of the generator up into a number of independent flues or passages running in a zigzag course from back to front and from front to back alternately from bottom to top of the generator. In this way intimate contact of the steam or gases with the material on each tray is assured, and, moreover, the large quantities of heat evolved in the reaction of the producer-gas with the iron to reduce the oxid of iron is stored up and rendered available for use in the oxidation stage of the working, great economy being thus attained. Each range or course of trays is also preferably disposed in slightly-staggered order with respect to the range next above, as shown in Fig. 3, a slight space being left between the end trays of each range at the front and back alternately. In this way the trays can expand evenly without interfering with uninterrupted course of the gases, as above described.

43 is the hydrogen-outlet to the supply-pipe 26.

44 is an outlet-pipe for the waste gases obtained in the reducing stage of the working—that is to say, when producer or other reducing gas is passed through the generator to reduce the iron oxid formed in the hydrogen-producing stage. A valve 45 is provided in the outlet-pipe 44 to enable this to be opened and closed when required.

46 is a manhole adapted to be closed by a suitable door and giving access to the interior of the generator to enable the trays to be placed in position therein. It will be understood that when the generator is first run to produce hydrogen the trays contain a suitable depth of metallic iron in finely-divided form and are piled up in position, as above explained. A convenient way of obtaining the finely-divided metallic iron is to fill the trays with oxid of iron and pile them in position in the furnace and then reduce the oxid to the metallic state by passing producer or water gas over it after it has been heated to the reqired temperature. When the iron is in the metallic state, valves 34ª 45 and air-inlet 39 are opened and the manholes, inlet 35, and valve 27 are closed. Water-gas or other gaseous fuel at a high temperature is admitted by the inlet 34. The gaseous fuel on meeting the air in the base of the generator is ignited by any suitable means and the hot products of combustion rise through the trays, thus heating them to a high temperature; the heat being absorbed and stored by the firebrick trays and filling. When the interior of the generator has thus been heated to a sufficient temperature, the gas-inlet 34, air-inlet 39, and valve 45 are closed and valve 27 is opened. Steam, preferably superheated, is turned on by the pipe 40 and circulates around the trays, oxidizing the iron thereon, the resulting hydrogen passing away by the pipe 26.

In order to revivify the iron, valve 27, inlet 34, and air-inlet 39 are closed and valve 45 is opened. Producer or water gas is then admitted by inlet 35 and in its passage around the trays reduces the iron oxid thereon, the waste gases passing away to a chimney or uptake by the valve 45. If necessary, the generator may be heated up in the manner above described before passing the producer or water gas therethrough to revivify the iron.

I do not in the present application claim the above-described apparatus for the manufacture of gas, as such apparatus forms the subject of a separate application divisional hereof and filed by me on January 21, 1903, Serial No. 139,941; but

What I claim in respect of the manufacture of methane from water-gas, which I define as any gas made by passing steam, superheated or otherwise, over or through ignited carbonaceous fuel, is—

1. The manufacture of gas for illuminating, heating or power purposes by producing water-gas by passing steam over ignited carbonaceous fuel, blending therewith a quantity of hydrogen sufficient substantially to convert the carbon contained in the carbon monoxid present in said gas into methane, and to convert the oxygen liberated from said oxid of carbon into water, and then passing such mixture of water-gas and hydrogen over nickel in the metallic state at a suitable temperature to effect the required reaction, substantially as described.

2. The manufacture of a gas consisting chiefly of methane by producing water-gas containing hydrogen carbon dioxid and carbon monoxid in such relative proportions that on removal of the dioxid the monoxid and hydrogen remain in approximately suitable proportion to produce methane and water, removing the dioxid and passing the resulting mixture of gases over metallic nickel at suitable temperature to effect the required reaction, substantially as described.

3. The manufacture of a gas consisting chiefly of methane, by producing water-gas containing hydrogen, carbon dioxid and carbon monoxid in such relative proportions that on removal of the dioxid the monoxid and hydrogen remain in suitable proportion to produce methane and water, removing the dioxid by combination with alkaline carbonate and passing the resulting mixture of gases over metallic nickel at suitable temperature to effect the required reaction, substantially as described.

4. In the manufacture of a gas consisting chiefly of methane by passage in contact with nickel of a gas consisting substantially of a mixture of carbon monoxid and hydrogen produced by passing steam over or through ignited carbonaceous material and removal, if necessary, of carbon dioxid, the hydrogen being present in or adjusted to suitable proportion to produce methane and water, heating said mixture of carbon monoxid and hydrogen prior to its admission to the nickel-chamber to a sufficient temperature to produce methane and water on contact with the nickel, substantially as described.

5. In the manufacture of a gas consisting chiefly of methane by passage in contact with nickel of a gas consisting substantially of a mixture of carbon monoxid and hydrogen produced by passing steam over or through ignited carbonaceous material and removal, if necessary, of carbon dioxid, the hydrogen being present in or adjusted to suitable proportion to produce methane and water on reaction with the nickel, controlling the temperature of the said reaction for the purpose specified.

6. The manufacture of gas consisting chiefly of methane, by blending with water-gas a quantity of hydrogen sufficient substantially to convert the carbon contained in the carbon dioxid present into methane and the liberated oxygen into water, and passing the mixture of water-gas and hydrogen over nickel in the metallic state at a suitable temperature to effect the required reaction, substantially as described.

7. The manufacture of gas consisting chiefly of methane, by blending with water-gas containing carbon monoxid and carbon dioxid a sufficient quantity of hydrogen to produce methane and water when in combination with the monoxid, removing the dioxid and passing the resulting mixture over metallic nickel at suitable temperature to effect the required reaction, substantially as described.

In witness whereof I have hereunto signed my name in the presence of two subscribing witnesses.

HERBERT S. ELWORTHY.

Witnesses:
　THOMAS L. WHITEHEAD,
　GEO. J. B. FRANKLIN.